(12) United States Patent
    Okamura et al.

(10) Patent No.: US 12,633,995 B2
(45) Date of Patent: May 19, 2026

(54) TERMINAL AND COMMUNICATION METHOD

(71) Applicant: NTT DOCOMO, INC., Tokyo (JP)

(72) Inventors: Masaya Okamura, Tokyo (JP); Tomoya Ohara, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 306 days.

(21) Appl. No.: 18/547,588

(22) PCT Filed: Apr. 5, 2021

(86) PCT No.: PCT/JP2021/014515
    § 371 (c)(1),
    (2) Date: Aug. 23, 2023

(87) PCT Pub. No.: WO2022/215121
    PCT Pub. Date: Oct. 13, 2022

(65) Prior Publication Data
    US 2024/0305354 A1     Sep. 12, 2024

(51) Int. Cl.
    *H04B 7/06*      (2006.01)
    *H04B 17/318*    (2015.01)
    *H04L 5/00*      (2006.01)

(52) U.S. Cl.
    CPC ....... *H04B 7/06966* (2023.05); *H04B 17/328* (2023.05); *H04L 5/0051* (2013.01)

(58) Field of Classification Search
    CPC .. H04B 7/06966; H04B 17/328; H04L 5/0051
    See application file for complete search history.

(56) References Cited

U.S. PATENT DOCUMENTS

| | | | | |
|---|---|---|---|---|
| 2023/0176163 A1* | 6/2023 | Yerramalli | ............ | G01S 5/0205 |
| | | | | 370/329 |
| 2023/0300776 A1* | 9/2023 | Duan | .................... | H04B 7/0695 |
| | | | | 455/456.1 |
| 2023/0396307 A1* | 12/2023 | Bhamri | .............. | H04B 7/06952 |
| 2024/0019533 A1* | 1/2024 | Tao | ........................... | G01S 5/04 |
| 2024/0040542 A1* | 2/2024 | Barbu | .................... | H04W 76/40 |
| 2024/0114473 A1* | 4/2024 | Yerramalli | ............ | H04W 64/00 |
| 2024/0195563 A1* | 6/2024 | Tao | ......................... | H04L 5/0048 |

OTHER PUBLICATIONS

International Search Report issued in PCT/JP2021/014515 on Nov. 16, 2021 (3 pages).
Written Opinion of the International Searching Authority issued in PCT/JP2021/014515 on Nov. 16, 2021 (3 pages).

(Continued)

*Primary Examiner* — Derrick V Rose
(74) *Attorney, Agent, or Firm* — Osha Bergman Watanabe & Burton LLP

(57)            ABSTRACT

A terminal includes: a reception unit configured to receive information indicating an expected angle of UL-AoA (Uplink Angle of Arrival) from a base station; a control unit configured to determine a beam to be applied to UL-PRS (Positioning Reference Signal), based on the information indicating the expected angle of UL-AoA; and a transmission unit configured to transmit the UL-PRS by applying the determined beam.

3 Claims, 8 Drawing Sheets

(56) References Cited

OTHER PUBLICATIONS

NTT Docomo, Inc.; "Discussion on UL-AoA positioning enhancements"; 3GPP TSG RAN WG1#104b-e, R1-2103581; e-Meeting; Apr. 12-20, 2021 (4 pages).

3GPP TS 38.300 V16.5.0; "3rd Generation Partnership Project; Technical Specification Group Radio Access Network; NR; NR and NG-RAN Overall Description; Stage 2 (Release 16)"; Mar. 2021 (151 pages).

3GPP TR 38.857 V17.0.0; "3rd Generation Partnership Project; Technical Specification Group Radio Access Network; Study on NR Positioning Enhancements; (Release 17)"; Mar. 2021 (545 pages).

* cited by examiner

10B

EXPECTED ANGLE OF UL−AoA

SRS

20

10A

INFORMATION INDICATING EXPECTED ANGLE OF AoA

START

S31

RECEIVE MULTIPLE UL-PRS CONFIGURATIONS

S32

PERFORM SWITCHING OF UL-PRS CONFIGURATION

END

START

S41

IS PREDETERMINED CONDITION SATISFIED?    NO

YES

S42

TRANSMIT UPDATE REQUEST
FOR EXPECTED ANGLE OF UL-AoA

END

TERMINAL AND COMMUNICATION METHOD

FIELD OF THE INVENTION

The present invention relates to a terminal and a communication method in a wireless communication system.

BACKGROUND OF THE INVENTION

Regarding NR (New Radio) (also referred to as "5G"), or a successor system to LTE (Long Term Evolution), technologies have been discussed which satisfy the following requirements: a high capacity system, high data transmission rate, low delay, simultaneous connection of multiple terminals, low cost, power saving, etc. (for example, Non-Patent Document 1).

In the release 17 NR positioning, the target is improved positioning accuracy and reduced latency as compared with the release 16 NR positioning. In addition, new scenarios are added such as industrial IoT (Internet of Things) (for example, Non-Patent Document 1).

CITATION LIST

Non-Patent Document

[Non-Patent Document 1] 3GPP TS 38.300 V16.5.0 (2021 March)
[Non-Patent Document 2] 3GPP TR 38.857 V17.0.0 (2021 March)

SUMMARY OF THE INVENTION

Technical Problem

With respect to the UL-AoA (Uplink Angle of Arrival) in the positioning, that is, an uplink angle of arrival, a function of indicating an expected UL-AoA from LMF (Location Management Function) to a base station is supported. On the other hand, indicating the expected angle of UL-AoA to a terminal to be applied to an operation related to the positioning has not been discussed.

The present invention has been made in view of the foregoing points and enables to improve positioning efficiency based on the expected uplink angle of arrival in a wireless communication system.

Solution to Problem

According to the disclosed technique, a terminal is provided. The terminal includes: a reception unit configured to receive information indicating an expected angle of UL-AoA (Uplink Angle of Arrival) from a base station; a control unit configured to determine a beam to be applied to UL-PRS (Positioning Reference Signal), based on the information indicating the expected angle of UL-AoA; and a transmission unit configured to transmit the UL-PRS by applying the determined beam.

Advantageous Effects of Invention

According to the disclosed technique, the positioning efficiency can be improved based on the expected uplink angle of arrival in a wireless communication system.

DETAILED DESCRIPTION OF THE PREFERRED EMBODIMENTS

Figure 1:
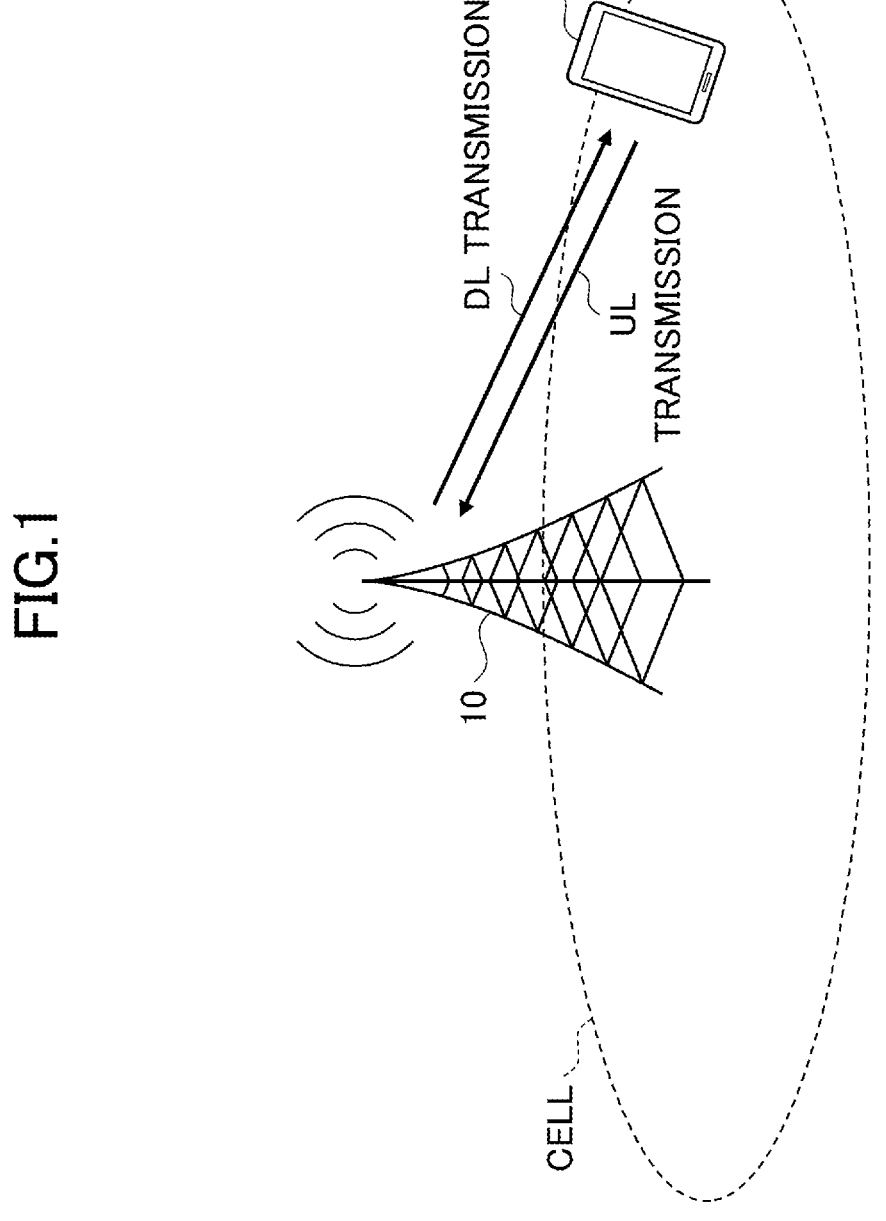
FIG. 1 is a drawing illustrating a configuration example of a wireless communication system according to an embodiment of the present invention.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used appropriately. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR).

Furthermore, in one or more embodiments described below, terms that are used in the existing LTE are used, such as SS (Synchronization signal), PSS (Primary SS), SSS (Secondary SS), PBCH (Physical broadcast channel), PRACH (Physical random access channel), PDCCH (Physical Downlink Control Channel), PDSCH (Physical Downlink Shared Channel), PUCCH (Physical Uplink Control Channel), PUSCH (Physical Uplink Shared Channel), etc. The above-described terms are used for the sake of description convenience. Signals, functions, etc., which are similar to the above-described terms, may be referred to as different names. Further, terms, which are used in NR and correspond to the above-described terms, are NR-SS, NR-PSS, NR-SSS, NR-PBCH, NR-PRACH, etc. However, even when a signal is used for NR, there may be a case in which the signal is not referred to as "NR-".

In addition, in an embodiment of the present invention, the duplex method may be a TDD (Time Division Duplex) method, an FDD (Frequency Division Duplex) method, or any other method (e.g., Flexible Duplex, or the like).

Further, in an embodiment of the present invention, the expression, radio (wireless) parameters are "configured (set)" may mean that a predetermined value is pre-configured, or may mean that a radio parameter indicated by the base station 10 or the terminal 20 is configured.

FIG. 1 is a drawing illustrating a configuration example of a wireless communication system according to an embodiment of the present invention. As illustrated in FIG. 1, a wireless communication system according to an embodiment of the present invention includes a base station 10 and a terminal 20. In FIG. 1, a single base station 10 and a single terminal 20 are illustrated as an example. There may be a plurality of base stations 10 and a plurality of terminals 20.

The base station 10 is a communication device that provides one or more cells and performs wireless communications with the terminal 20. Physical resources of radio signals may be defined in the time domain and the frequency domain, the time domain may be defined by the number of OFDM (Orthogonal Frequency Division Multiplexing) symbols, and the frequency domain may be defined by the number of sub-carriers or resource blocks. The base station 10 transmits a synchronization signal and system information to the terminal 20. The synchronization signal is, for example, an NR-PSS and an NR-SSS. The system information is transmitted via, for example, a NR-PBCH, and may be referred to as broadcast information. The synchronization signal and the system information may be referred to as an SSB (SS/PBCH block). As shown in FIG. 1, the base station 10 transmits a control signal or data in DL (Downlink) to the terminal 20 and receives a control signal or data in UL (Uplink) from the terminal 20. The base station 10 and terminal 20 are capable of transmitting and receiving a signal by performing the beamforming. Further, the base station 10 and the terminal 20 can both apply MIMO (Multiple Input Multiple Output) communication to DL or UL. Further, the base station 10 and the terminal 20 may both perform communications via a secondary cell (Scell: Secondary Cell) and a primary cell (PCell: Primary Cell) using CA (Carrier Aggregation). In addition, the terminal 20 may perform communications via a primary cell of the base station 10 and a primary secondary cell group cell (PSCell: Primary SCG Cell) of another base station 10 using DC (Dual Connectivity).

The terminal 20 may be a communication apparatus that includes a wireless communication function such as a smartphone, a mobile phone, a tablet, a wearable terminal, a communication module for M2M (Machine-to-Machine), or the like. As shown in FIG. 1, the terminal 20 uses various communication services provided by the wireless communication system by receiving control signals or data in DL from the base station 10 and transmitting control signals or data in UL to the base station 10. In addition, the terminal 20 receives various reference signals transmitted from the base station 10 and performs measurement of the propagation path quality based on the reception result of the reference signals.

Here, in the release 17 NR positioning, the target is improved positioning accuracy and reduced latency as compared with the release 16 NR positioning. In addition, new scenarios are added such as industrial IoT (Internet of Things).

Table 1 is an example of target technical specifications with respect to the release 16 NR positioning and the release 17 NR positioning.

TABLE 1

| Release | Scenario | Target accuracy | Target latency |
|---|---|---|---|
| Rel-16 NR Positioning | Outdoor | Vertical error: <3 m Horizontal error: <10 m | <1 s |
| | Indoor | Vertical error: <3 m | |
| Rel-17 NR Positioning | General commercial use case | <1 m | <100 ms |
| | Industrial IoT use case (e.g. indoor factory) | <0.2 m | <100 ms (for some IIoT use cases, latency in the order of 10 ms is desired) |

As illustrated in Table 1, in the release 16 NR positioning, with respect to the outdoor scenario, the target accuracy is less than 3 m for vertical error and less than 10 m for horizontal error, and the target latency is less than 1 s. In addition, with respect to the indoor scenario, the target accuracy is less than 3 m for vertical error and less than 3 m for horizontal error, and the target latency is less than 1 s.

On the other hand, as illustrated in Table 1, in the release 17 NR positioning, with respect to the general commercial use case, the target accuracy is less than 1 m, and the target latency is less than 100 ms. In addition, with respect to the industrial IoT use case, the target accuracy is less than 0.2 m, and the target latency is less than 100 ms and it is desirable that the target latency is in the order of 10 ms depending on the use case.

With respect to the release 17 NR positioning, discussions are being held by assuming that the general commercial use case and the industrial IoT use case are to achieve: the high accuracy in the horizontal direction and the vertical direction; low latency; network efficiency related to scalability, RS (Reference Signal) overhead, and the like; and device efficiency related to power consumption, implementation complexity, and the like.

In addition, enhancements of the RAT (Radio Access Technology) dependent positioning and the RAT independent positioning for both FR1 (Frequency Range 1) and FR2 (Frequency Range 2) are being discussed in order to improve positioning accuracy, latency, and network and/or device efficiency.

For example, discussions are being held with respect to the procedure, measurements, reporting, signaling, and the like, for improving the accuracy of: UL-AoA (Uplink Angle of Arrival) for network-based positioning solutions; and DL-AoD (Downlink Angle of Departure) for network-based (including terminal-assisted) positioning solutions.

Figure 2:
FIG. 2 is a drawing illustrating an expected angle of UL-AoA.

FIG. 2 is a drawing illustrating an expected angle of UL-AoA. As illustrated in FIG. 2, the expected angle of UL-AoA (expected UL-AoA) at a base station 10B may be calculated, for example, as an angle of tangent with respect to the cell coverage of a base station 10A to which a terminal 20 that transmits corresponding UL belongs. Note that the relative locational relationship illustrated in FIG. 2 indicates an example in which an SRS (Sounding Reference Signal) transmitted by the terminal 20 does not reach the base station 10B.

Here, with respect to the UL-AoA in the positioning, that is, an uplink angle of arrival, a function of indicating an expected UL-AoA from LMF (Location Management Function) to a base station is supported. On the other hand, indicating the expected angle of UL-AoA to a terminal to be applied to an operation related to the positioning has not been discussed.

Therefore, information indicating the expected angle of UL-AoA (positioning angle width) with respect to UL-PRS (Positioning Reference Signal) may be indicated from the network to the terminal 20 via RRC (Radio Resource Control) signaling, MAC-CE (Media Access Control-Control Element), DCI (Downlink Control Information), or the like. In addition, a plurality of UL-PRS configurations may be indicated from the network to the terminal 20 via RRC signaling, MAC-CE, DCI, or the like. In addition, the terminal 20 may request the network to update the information indicating the expected angle of UL-AoA.

Figure 3:
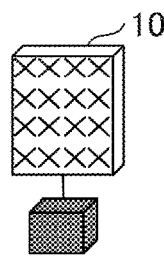
FIG. 3 is a drawing illustrating an operation example related to UL-PRS transmission.
Figure 3:
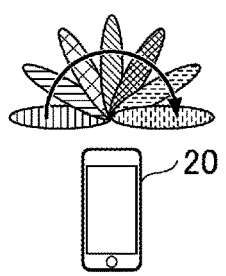

FIG. 3 is a drawing illustrating an operation example related to UL-PRS transmission. FIG. 3 is, for example, an example of release 16 UL-PRS transmission. FIG. 3 illustrates an example in which the terminal 20 transmits seven (7) UL-PRS beams having angles from −90 degrees to +90 degrees assuming that the front direction of the terminal 20 is 0 degrees. For example, the UL-PRS beams illustrated in FIG. 3 may be transmitted in directions of −90 degrees, −60 degrees, −30 degrees, 0 degrees, +30 degrees, +60 degrees, and +90 degrees. The base station 10 may perform network-based positioning based on the received UL-PRS.

Figure 4:
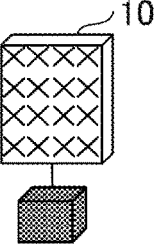
FIG. 4 is a drawing illustrating an operation example of information transmission related to an embodiment of the present invention.
Figure 4:
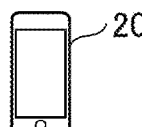

FIG. 4 is a drawing illustrating an operation example of information transmission related to an embodiment of the present invention. As illustrated in FIG. 4, the base station 10 may indicate an expected angle of UL-AoA to the terminal 20. For example, the expected angle of UL-AoA may be indicated to the terminal 20 as described in the following examples a) to c).

a) May be indicated by AoA angle width such as −Da to +Da [degrees]. For example, when "Da=180" is indicated, the terminal 20 may assume that the expected angle of UL-AoA is from −180 degrees to +180 degrees.

b) May be indicated by UL-PRS resource ID that is included in a specific angle width. For example, SRS for positioning resource ID #2, SRS for positioning resource ID #3, SRS for positioning resource ID #4, and SRS for positioning resource ID #5 may be indicated as an expected angle of UL-AoA. In addition, for example, the expected angle of UL-AoA may be indicated by a UL-PRS resource set ID or may be indicated by a beam index.

c) May be indicated by "−Db to +Db [degrees]" and SRS for positioning resource ID. For example, when "Db=60" is indicated, angles from −60 degrees to +60 degrees may be assumed to be the expected angle of UL-AoA assuming that the beam direction corresponding to the SRS for positioning resource ID is 0 degrees.

In addition, with respect to the expected angle of UL-AoA that is configured in or indicated to the terminal 20 from the base station 10, the following d) to f) may be assumed.

d) May be reception angle information assumed by the base station 10, and the above-described a) may be applied.

e) May be transmission angle information assumed by the terminal 20, and the above-described a), b), and c) may be applied.

f) May be location information (coordinate information) of the base station 10.

The terminal 20 may report, to the network, which of the above-described d) to f) is supported via UE capability. In addition, the network may indicate, to the terminal 20, which of the above-described d) to f) is supported. In addition, the terminal 20 may report, to the network, which of the above-described a) to c) is supported via UE capability. In addition, the network may indicate, to the terminal 20, which of the above-described a) to c) is supported.

In addition, a UL-PRS parameter that is configured in or indicated to the terminal 20 from the base station 10 may correspond to the expected angle of UL-AoA. The UL-PRS parameter may be, for example, the number of resource IDs, or may be the number of resource set IDs.

For example, when the number of UL-PRS resource set IDs, 8, is configured in the terminal 20, the expected angle of UL-AoA may be −180 to +180 [degrees], and the terminal 20 may assume a UL beam that covers the above-described angle width.

For example, when the number of UL-PRS resource set IDs=4 is configured in the terminal 20, the expected angle of UL-AoA may be −120 to +120 [degrees], and the terminal 20 may assume a UL beam that covers the above-described angle width.

In addition, with respect to the expected angle of UL-AoA to be indicated, the terminal 20 may assume one of the following g) to i).

g) Azimuth AoA (also referred to as AoA), that is, an azimuth angle of arrival h) Zenith AoA (also referred to as ZoA), that is, a zenith angle of arrival i) AoA and ZoA, that is, an azimuth angle of arrival and a zenith angle of arrival.

The terminal 20 may report, to the network, which of the above-described g) to i) is supported via UE capability. In addition, the network may indicate, to the terminal 20, which of the above-described g) to i) is supported.

Figure 5:
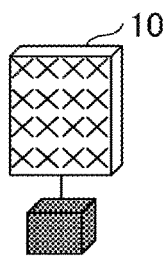
FIG. 5 is a drawing illustrating an operation example (1) of UL-PRS transmission related to an embodiment of the present invention.
Figure 5:
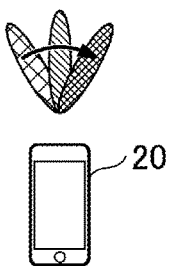

FIG. 5 is a drawing illustrating an operation example (1) of UL-PRS transmission related to an embodiment of the present invention. As illustrated in FIG. 5, in a case where the expected angle of UL-AoA is indicated to the terminal 20, the terminal 20 may reduce the number of beams as compared with the normal UL-PRS transmission, based on the angle. For example, the "normal" transmission may mean an operation of transmitting seven (7) UL-PRS beams having angles from −90 degrees to +90 degrees as illustrated in FIG. 3, and an operation in which the number of beams is reduced relative to "normal" as illustrated in FIG. 5 may mean an operation of transmitting three (3) UL-PRS beams having angles of −30 degrees, 0 degrees, and +30 degrees. The expected angle of UL-AoA that is indicated in FIG. 5 may be angles from −30 degrees to +30 degrees to which the above-described a) is applied. In other words, the terminal 20 may assume UL beams that cover the indicated expected angle of UL-AoA.

Figure 6:
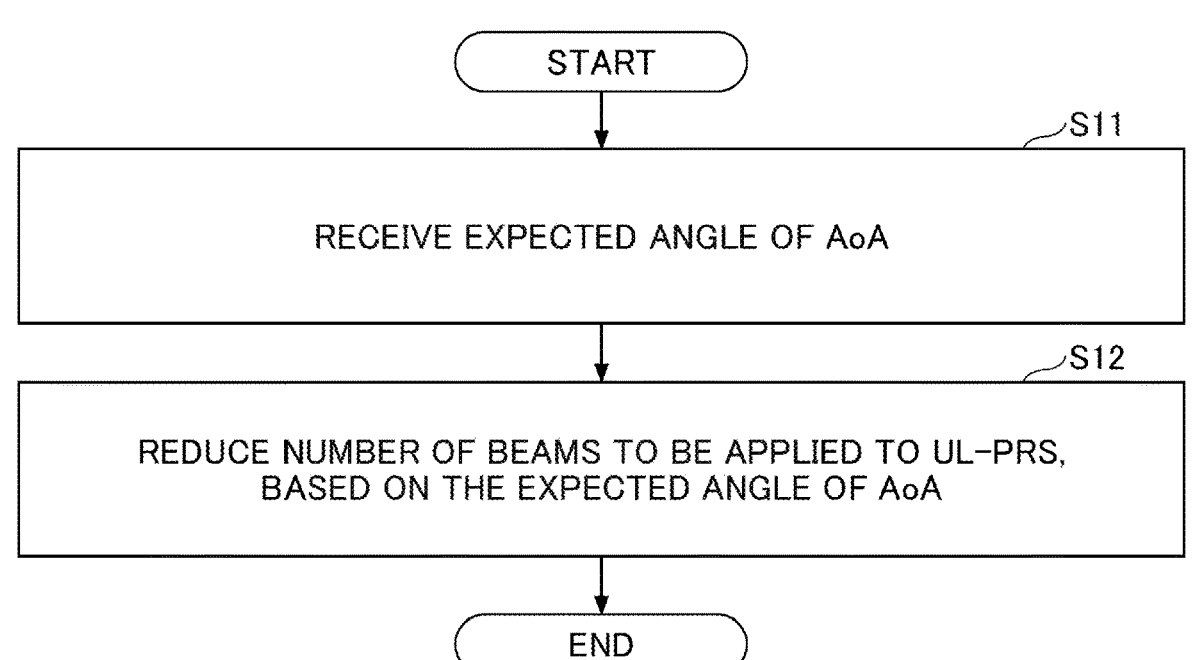
FIG. 6 is a flowchart illustrating an operation example (1) of UL-PRS transmission related to an embodiment of the present invention.

FIG. 6 is a flowchart illustrating an operation example (1) of UL-PRS transmission related to an embodiment of the present invention. In step S11, the terminal 20 receives an expected angle of UL-AoA from the base station 10. In subsequent step S12, the terminal 20 reduces the number of beams to be applied to UL-PRS, based on the received angle of UL-AoA.

Figure 7:
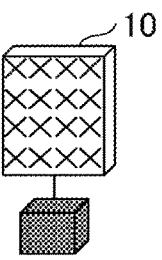
FIG. 7 is a drawing illustrating an operation example (2) of UL-PRS transmission related to an embodiment of the present invention.
Figure 7:
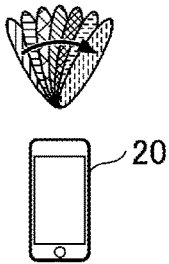

FIG. 7 is a drawing illustrating an operation example (2) of UL-PRS transmission related to an embodiment of the present invention. As illustrated in FIG. 5, in a case where the expected angle of UL-AoA is indicated to the terminal 20, the terminal 20 may narrow the beam width as compared with the normal UL-PRS transmission, based on the angle. For example, the "normal" transmission may mean an operation of transmitting seven (7) UL-PRS beams having angles from −90 degrees to +90 degrees as illustrated in FIG. 3, and an operation in which the beam width is narrowed relative to "normal" may mean an operation of transmitting seven (7) UL-PRS beams having angles from −30 degrees to +30 degrees. For example, the 7 UL-PRS beams illustrated in FIG. 7 may be beams having angles of −30 degrees, −20 degrees, −10 degrees, 0 degrees, +10 degrees, +20 degrees, and +30 degrees. The expected angle of UL-AoA that is indicated in FIG. 7 may be angles from −30 degrees to +30 degrees to which the above-described a) is applied. In other words, the terminal 20 may assume UL beams that cover the indicated expected angle of UL-AoA. Note that the beam width may be an angle width corresponding to a range in which a plurality of beams are transmitted, or may be a range of an area that is covered by one beam.

Figure 8:
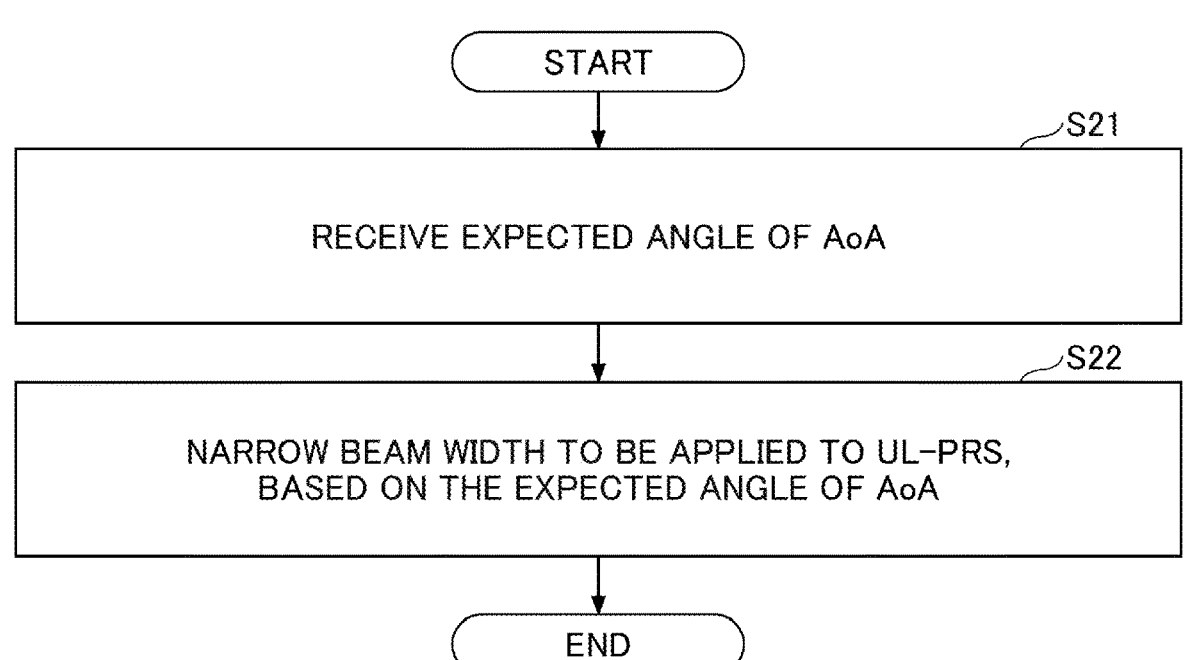
FIG. 8 is a flowchart illustrating an operation example (2) of UL-PRS transmission related to an embodiment of the present invention.

FIG. 8 is a flowchart illustrating an operation example (2) of UL-PRS transmission related to an embodiment of the present invention. In step S21, the terminal 20 receives an expected angle of UL-AoA from the base station 10. In subsequent step S22, the terminal 20 narrows the beam width to be applied to UL-PRS, based on the received angle of UL-AoA.

In addition, the terminal 20 may assume that a plurality of UL-PRS configurations are indicated from the network to the terminal 20 via RRC signaling, MAC-CE, DCI, or the like.

Figure 9:
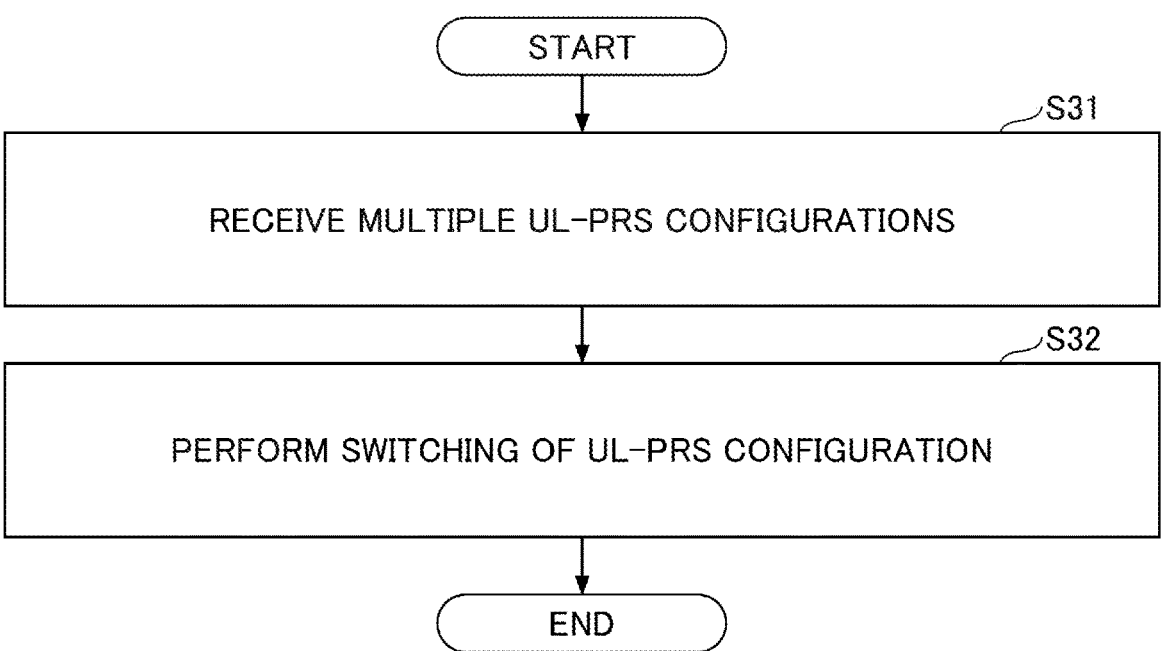
FIG. 9 is a flowchart illustrating an operation example of UL-PRS configuration related to an embodiment of the present invention.

FIG. 9 is a flowchart illustrating an operation example of UL-PRS configuration related to an embodiment of the present invention. In step S31, the terminal 20 receives a plurality of UL-PRS configurations from the base station 10. In subsequent step S32, the terminal 20 switches the UL-PRS configuration.

For example, a UL-PRS configuration for the UL-AoA measurement and a UL-PRS configuration for determining an expected angle of UL-AoA may be individually configured in or indicated to the terminal 20 from the base station 10. In addition, for example, a UL-PRS configuration in a case where the expected angle of UL-AoA is enabled and a UL-PRS configuration in a case where the expected angle of UL-AoA is disabled may be individually configured in or indicated to the terminal 20 from the base station 10. In addition, for example, a UL-PRS configuration for the UL-AoA measurement and a UL-PRS configuration for determining an expected angle of UL-AoA may be the same. In addition, for example, whether the UL-PRS configurations are independently configured for each use case or are configured as the same may be configured or indicated by the network.

For example, in a case where a plurality of UL-PRS configurations are configured or indicated, the terminal 20 may assume switching between the UL-PRS configurations. For example, the terminal 20 may periodically perform switching of the UL-PRS configuration, and the network may configure or indicate a switching period in or to the terminal 20. Further, for example, the terminal 20 may perform semi-static switching of the UL-PRS configuration, and the network may indicate a switching indication to the terminal 20.

In addition, the terminal 20 may request the network to update the expected angle of UL-AoA. For example, the update-requested expected angle of UL-AoA may be AoA alone, ZoA alone, or both AoA and ZoA. For example, the terminal 20 may transmit a request for updating the expected angle of UL-AoA to the network via RRC signaling, MAC-CE, Layer 1 signaling, PUCCH, PUSCH, or the like.

In addition, for example, the terminal 20 may transmit a request for updating the expected angle of UL-AoA, based on the RSRP (Reference Signal Received Power) value or the RSRQ (Reference Signal Received Quality) value that is obtained according to CSI-RS (Channel State Information-Reference Signal) or DL-PRS.

Figure 10:
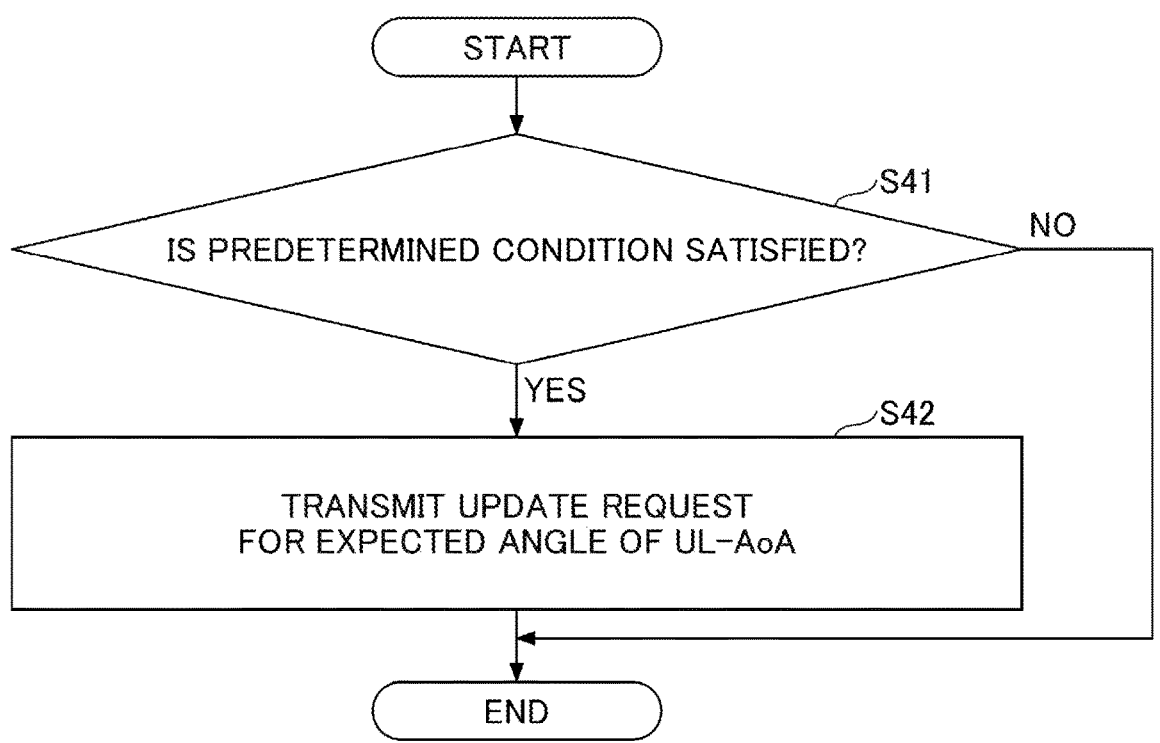
FIG. 10 is a flowchart illustrating an operation example of information transmission related to an embodiment of the present invention.

FIG. 10 is a flowchart illustrating an operation example of information transmission related to an embodiment of the present invention. In step S41, the terminal 20 determines whether a predetermined condition is satisfied. In a case where the predetermined condition is satisfied (YES in S41), the flow proceeds to step S42, and in a case where the predetermined condition is not satisfied (NO in S41), the flow ends. In step S42, the terminal 20 transmits a request for updating the expected angle of UL-AoA to the base station 10.

The predetermined condition in step S41 may be a case in which the RSRP value of a DL reference signal such as CSI-RS, DL-PRS, or the like, becomes less than a threshold value. That is, in a case where the RSRP value becomes less than the threshold value, the terminal 20 may transmit a request for updating the expected angle of UL-AoA to the base station 10.

The predetermined condition in step S41 may be a case in which, in a case where the terminal 20 has LOS (Line of sight)-NLOS (Non line of sight) information of a DL beam, the NLOS rate becomes greater than a threshold value. That is, in a case where the NLOS rate becomes greater than the threshold value, the terminal 20 may transmit a request for updating the expected angle of UL-AoA to the base station 10. Note that the LOS-NLOS rate may be calculated from, for example, the periodically determined LOS-NLOS for a predetermined number of times.

The above-described threshold value may be defined by technical specifications in advance, or may be configured in or indicated to the terminal 20 from the base station 10 via RRC, MAC-CE, or DCI.

Note that the UL-PRS may be replaced with SRS for positioning, SRS, or the like. The beam may be replaced with a spatial domain filter, a spatial beam, a spatial precoder, or the like. The expected angle of UL-AoA may be replaced with UL-AoA range, assisted AoA, or the like. The base station 10 or gNB may be replaced with TRP (Transmission/Reception point), RP (Reception Point), or the like.

Note that the AoA may be an angle of arrival in the horizontal direction, or an angle of arrival in both the horizontal direction and the vertical direction. The ZoA may be an angle of arrival in the vertical direction. The expected angle of UL-AoA may be AoA (azimuth angle of arrival), may be ZoA (zenith angle of arrival), may be AoA and ZoA, or may include height information of gNB.

Note that the expected angle of UL-AoA may be assumed to be used for the purpose other than the UL-AoA measurement. For example, the expected angle of UL-AoA may be used for a reception beam of the terminal 20 at the time of DL-AoD measurement (for example, at the time of DL-PRS reception). For example, the terminal 20 may determine the direction of a reception beam, based on the expected angle of UL-AoA. In addition, the expected angle of UL-AoA may be used for LOS-NLOS detection by the terminal 20. For example, the terminal 20 may determine that a path or a beam that is included in the expected angle of UL-AoA is LOS, and that a path or a beam that is outside the expected angle of UL-AoA is NLOS.

Note that the terminal 20 may assume that the destination of the UL-PRS beam transmission according to the expected angle of UL-AoA is the following 1) or 2). The terminal 20 may be configured or indicated by the network to assume the following 1) and/or 2).

1) The base station 10 that is a serving cell.

2) The base station 10 that is not a serving cell. For example, the base station 10 that is a neighbor cell or the like. The terminal 20 may assume that the information related to the UE transmission beam (UL-PRS resource ID, etc.) has already been indicated from the base station 10 that is a serving cell to the base station 10 that is not a serving cell, or may assume only the base station 10 whose positioning of AoA has already been performed or whose positioning of the expected angle of UL-AoA has already been performed as the base station 10 that is not a serving cell.

According to an embodiment of the present invention, the terminal 20 can improve the AoA positioning accuracy. In addition, the terminal 20 can avoid unnecessary transmission in a UL-PRS resource, and can reduce the power consumption. In addition, the terminal 20 can use a beam that is suitable for the use case by performing switching between UL-PRS for UL-AoA positioning and UL-PRS for UL-AoA determination. In addition, the expected angle of UL-AoA can be appropriately updated even in a case where the terminal 20 has performed movement.

That is, the positioning efficiency can be improved based on the expected uplink angle of arrival in a wireless communication system.

(Device Configuration)

Next, a functional configuration example of the base station 10 and the terminal 20 for performing the processes and operations described above will be described. The base station 10 and terminal 20 include functions for implementing the embodiments described above. It should be noted, however, that each of the base stations 10 and the terminal 20 may include only some of the functions in an embodiment.

<Base Station 10>

Figure 11:
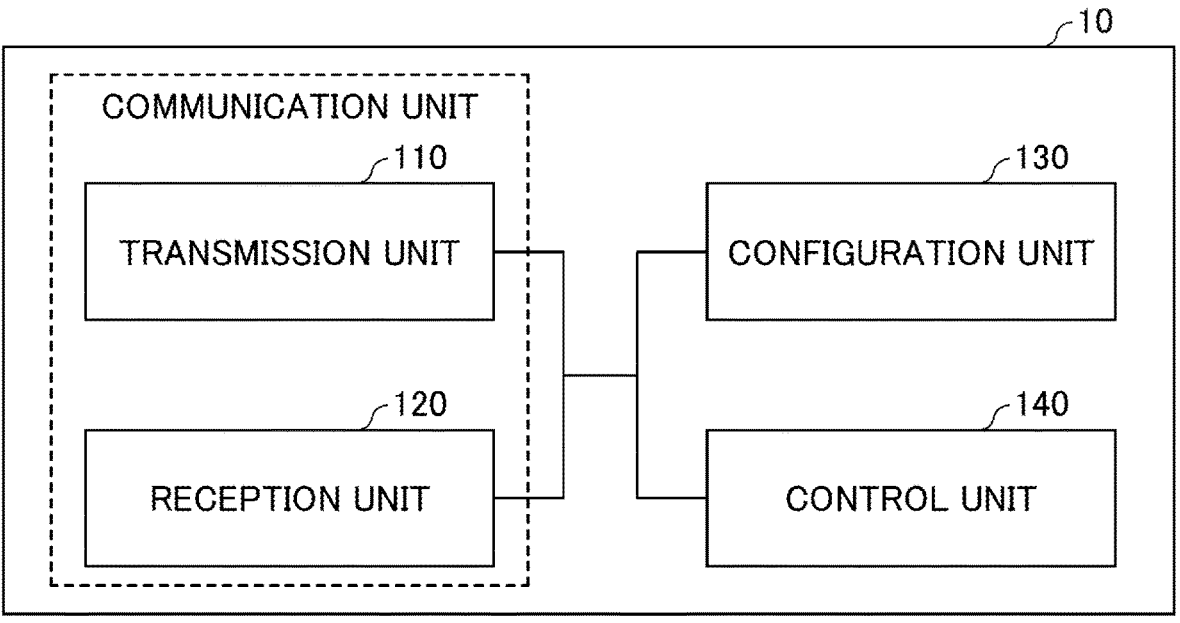
FIG. 11 is a drawing illustrating an example of a functional structure of a base station 10 related to an embodiment of the present invention.

FIG. 11 is a drawing illustrating an example of a functional structure of a base station 10 according to an embodiment of the present invention. As shown in FIG. 11, the base station 10 includes a transmission unit 110, a reception unit 120, a configuration unit 130, and a control unit 140. The functional structure illustrated in FIG. 11 is merely an example. Functional divisions and names of functional units may be anything as long as operations according to an embodiment of the present invention can be performed.

The transmission unit 110 includes a function for generating a signal to be transmitted to the terminal 20 side and transmitting the signal wirelessly. Further, the transmission unit 110 transmits an inter-network-node message to another network node. The reception unit 120 includes a function for receiving various signals transmitted from the terminal 20 and acquiring, for example, information of a higher layer from the received signals. Further, the transmission unit 110 has a function to transmit NR-PSS, NR-SSS, NR-PBCH, DL/UL control signals, and the like to the terminal 20. Further, the reception unit 120 receives an inter-network-node message from another network node.

The configuration unit 130 stores preset information and various configuration information items to be transmitted to the terminal 20. Contents of the configuration information are, for example, information related to the positioning.

The control unit 140 performs control related to the positioning as described in the embodiments. The functional units related to signal transmission in the control unit 140 may be included in the transmission unit 110, and the functional units related to signal reception in the control unit 140 may be included in the reception unit 120.

<Terminal 20>

Figure 12:
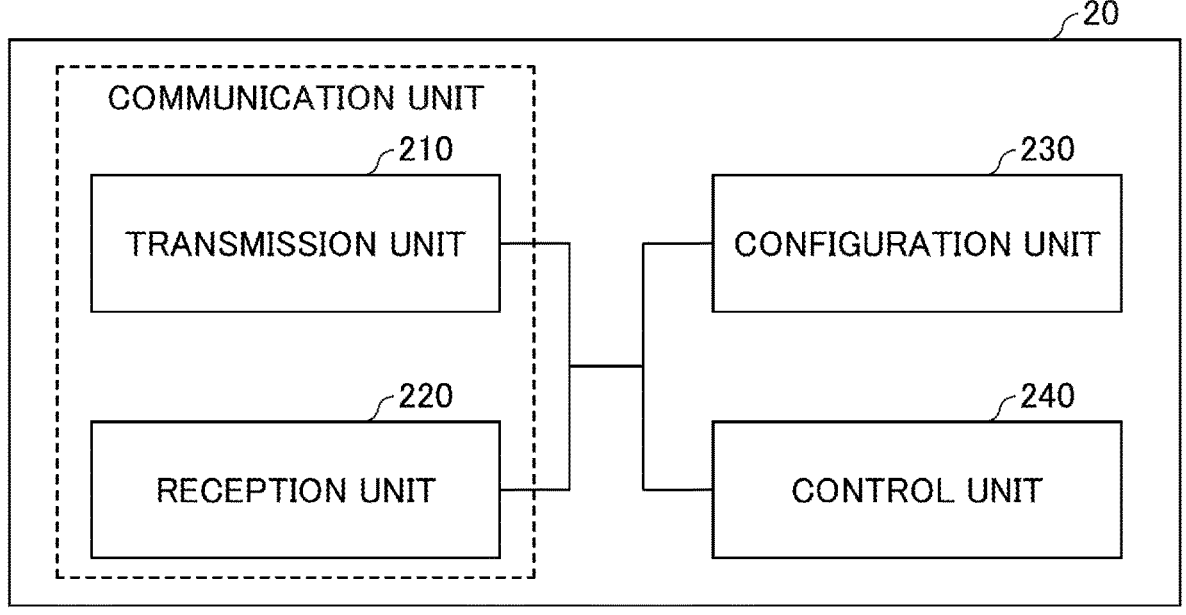
FIG. 12 is a drawing illustrating an example of a functional structure of a terminal 20 related to an embodiment of the present invention.

FIG. 12 is a drawing illustrating an example of a functional structure of a terminal 20 according to an embodiment of the present invention. As shown in FIG. 12, the terminal 20 includes a transmission unit 210, a reception unit 220, a configuration unit 230, and a control unit 240. The functional structure illustrated in FIG. 12 is merely an example. Functional divisions and names of functional units may be anything as long as operations according to an embodiment of the present invention can be performed.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL/SL control signals, etc., transmitted from the base station 10. Further, for example, with respect to the D2D communications, the transmission unit 210 transmits, to another terminal 20, PSCCH (Physical Sidelink Control Channel), PSSCH (Physical Sidelink Shared Channel), PSDCH (Physical Sidelink Discovery Channel), PSBCH (Physical Sidelink Broadcast Channel), etc., and the reception unit 220 receives, from the another terminal 20, PSCCH, PSSCH, PSDCH, or PSBCH.

The configuration unit 230 stores various configuration information items received by the reception unit 220 from the base station 10. In addition, the configuration unit 230 also stores pre-configured configuration information. Contents of the configuration information are, for example, information related to the positioning.

The control unit 240 performs control related to the positioning as described in the embodiments. The functional units related to signal transmission in the control unit 240 may be included in the transmission unit 210, and the functional units related to signal reception in the control unit 240 may be included in the reception unit 220.

(Hardware Structure)

In the above functional structure diagrams used for describing an embodiment of the present invention (FIG. 11 and FIG. 12), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming; broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 13:
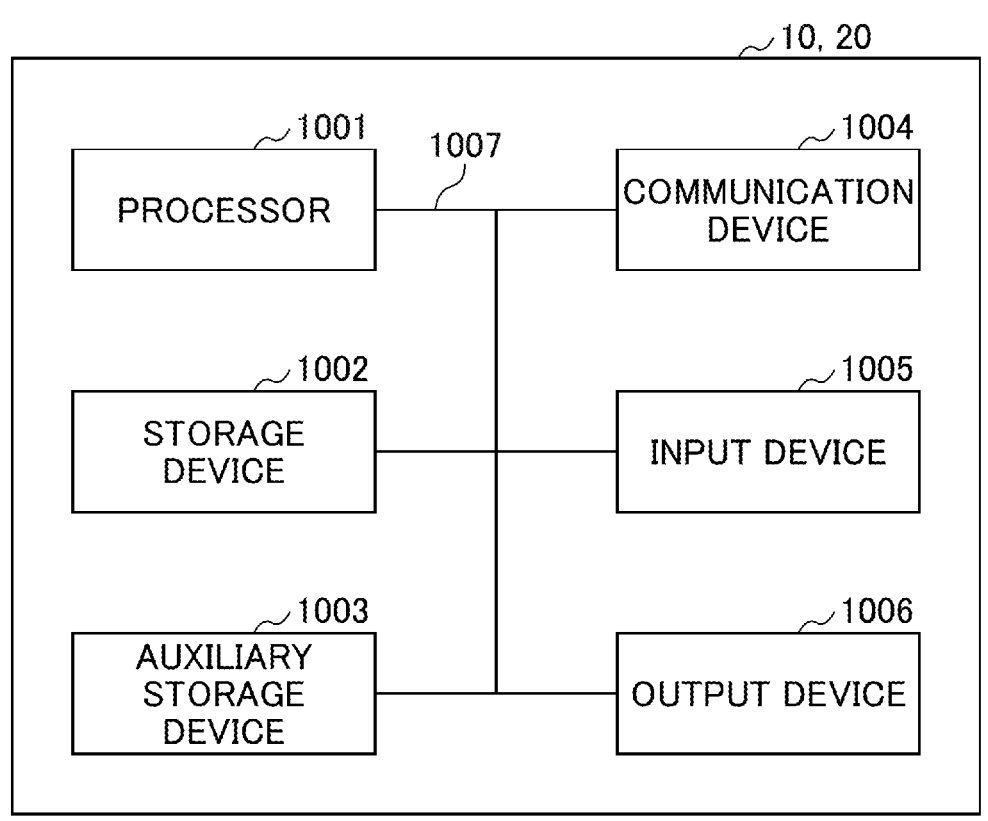
FIG. 13 is a drawing illustrating an example of a hardware structure of the base station 10 or the terminal 20 related to an embodiment of the present invention.

For example, the base station 10, terminal 20, etc., according to an embodiment of the present disclosure may function as a computer for processing the radio communication method of the present disclosure. FIG. 13 is a drawing illustrating an example of hardware structures of the base station 10 and terminal 20 according to an embodiment of the present invention. Each of the above-described base station 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station 10 and terminal 20 may include one or more of each of the devices illustrated in the figure, or may not include some devices.

Each function in the base station 10 and terminal 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads out onto the storage device 1002 a program (program code), a software module, or data from the auxiliary storage apparatus 1003 and/or the communication apparatus 1004, and performs various processes according to the program, the software module, or the data. As the program, a program is used that causes the computer to perform at least a part of operations according to an embodiment of the present invention described above. For example, the control unit 140 of the base station 10 illustrated in FIG. 11 may be realized by control programs that are stored in the storage device 1002 and are executed by the processor 1001. Further, for example, the control unit 240 of the terminal 20 illustrated in FIG. 12 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage apparatus 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage apparatus 1002 may be referred to as a register, a cache, a main memory, etc. The storage apparatus 1002 is capable of storing programs (program codes), software modules, or the like, that are executable for performing communication processes according to an embodiment of the present invention.

The auxiliary storage apparatus 1003 is a computer-readable recording medium, and may include at least one of, for example, an optical disk such as a CD-ROM (Compact Disc ROM), a hard disk drive, a flexible disk, a magneto optical disk (e.g., compact disc, digital versatile disc, Blu-ray (registered trademark) disk), a smart card, a flash memory (e.g., card, stick, key drive), a floppy (registered trademark) disk, a magnetic strip, etc. The above recording medium may be a database including the storage apparatus 1002 and/or the auxiliary storage apparatus 1003, a server, or any other appropriate medium.

The communication apparatus 1004 is hardware (transmission and reception device) for communicating with computers via at least one of a wired network and a wireless network, and may be referred to as a network device, a network controller, a network card, a communication module, etc. The communication apparatus 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output apparatus 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage apparatus 1002, etc., are connected to each other via the bus 1007 used for communicating information. The bus 1007 may include a single bus, or may include different buses between the apparatuses.

Further, each of the base station 10 and terminal 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

(Embodiment Summary)

As described above, according to an embodiment of the present invention, a terminal is provided. The terminal includes: a reception unit configured to receive information indicating an expected angle of UL-AoA (Uplink Angle of Arrival) from a base station; a control unit configured to determine a beam to be applied to a UL-PRS (Positioning Reference Signal), based on the information indicating the expected angle of UL-AoA; and a transmission unit configured to transmit the UL-PRS by applying the determined beam.

According to the above configuration, the terminal 20 can improve the AoA positioning accuracy. In addition, the terminal 20 can avoid unnecessary transmission in a UL-PRS resource, and can reduce the power consumption. In addition, the terminal 20 can use a beam that is suitable for the use case by performing switching between UL-PRS for UL-AoA positioning and UL-PRS for UL-AoA determination. In addition, the expected angle of UL-AoA can be appropriately updated even in a case where the terminal 20 has performed movement. That is, the positioning efficiency can be improved based on the expected uplink angle of arrival in a wireless communication system.

The control unit may reduce a number of beams to be applied to the UL-PRS, based on the information indicating the expected angle of the UL-AoA. According to the configuration, the terminal 20 can avoid unnecessary transmission in a UL-PRS resource, and can reduce the power consumption.

The control unit may reduce a range of angle in which the beams to be applied to the UL-PRS are transmitted, based on the information indicating the expected angle of the UL-AoA. According to the configuration, the terminal 20 can avoid unnecessary transmission in a UL-PRS resource, and can improve the accuracy.

The reception unit may receive a plurality of configurations related to the UL-PRS from the base station, and the control unit may determine which of the plurality of configurations is to be used. According to the configuration, the terminal 20 can use a beam that is suitable for the use case by performing switching between UL-PRS for UL-AoA positioning and UL-PRS for UL-AoA determination.

In a case where the control unit determines that an RSRP (Reference Signal Received Power) value of a downlink reference signal becomes less than a threshold value, the transmission unit may transmit a request for updating the information indicating the expected angle of the UL-AoA to the base station. According to the configuration, the expected angle of UL-AoA can be appropriately updated even in a case where the terminal 20 has performed movement.

In addition, according to an embodiment of the present invention, a communication method of a terminal is provided. The communication method includes: receiving information indicating an expected angle of UL-AoA (Uplink Angle of Arrival) from a base station; determining a beam to be applied to UL-PRS (Positioning Reference Signal), based on the information indicating the expected angle of UL-AoA; and transmitting the UL-PRS by applying the determined beam.

According to the above configuration, the terminal 20 can improve the AoA positioning accuracy. In addition, the terminal 20 can avoid unnecessary transmission in a UL-PRS resource, and can reduce the power consumption. In addition, the terminal 20 can use a beam that is suitable for the use case by performing switching between UL-PRS for UL-AoA positioning and UL-PRS for UL-AoA determination. In addition, the expected angle of UL-AoA can be appropriately updated even in a case where the terminal 20 has performed movement. That is, the positioning efficiency can be improved based on the expected uplink angle of arrival in a wireless communication system.

(Supplement of Embodiment)

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station 10 and the terminal 20 have been described by using functional block diagrams. However, the apparatuses may be realized by hardware, software, or a combination of hardware and software. The software executed by a processor included in the base station 10 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station 10 in the present specification, may be performed by an upper node in some cases. In a network including one or more network nodes including the base station 10, it is apparent that various operations performed for communicating with the terminal 20 may be performed by the base station 10 and/or another network node other than the base station 10 (for example, but not limited to, MME or S-GW). According to the above, a case is described in which there is a single network node other than the base station 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station Apparatus", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple terminals 20 (e.g., may be referred to as D2D (Device-to-Device), V2X (Vehicle-to-Everything), etc.). In this case, the function of the base station 10 described above may be provided by the terminal 20. Further, the phrases "up" and "down" may also be replaced by the phrases corresponding to terminal-to-terminal communication (e.g., "side"). For example, an uplink channel, a downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures), or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming", "expecting", or "considering", etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "based on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts", "circuits", "devices", etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.) may be replaced with a TTI having a time length exceeding 1 ms, and the short TTI (e.g., shortened TTI, etc.) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in an RB may be the same, regardless of the numerology, and may be 12, for example. The number of subcarriers included in an RB may be determined on the basis of numerology.

Further, the time domain of a RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), sub-carrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a UE, one or more BWPs may be configured in one carrier.

At least one of the configured BWPs may be activated, and the UE may assume that the UE will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in a RB, the number of symbols in a TTI, the symbol length, the cyclic prefix (CP) length, and the like, may be changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

An aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE NUMERALS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Storage device
1003 Auxiliary storage device
1004 Communication device
1005 Input device
1006 Output device

The invention claimed is:

1. A terminal comprising:
a transmitter configured to transmit a message requesting information indicating an expected angle of arrival for a downlink signal at the terminal in positioning; and
a receiver configured to receive the information indicating the expected angle of arrival for the downlink signal.

2. The terminal according to claim 1, wherein the information indicating the expected angle of arrival for the downlink signal includes an angle width of arrival in a horizontal direction and an angle width of arrival in a vertical direction.

3. A communication method executed by a terminal, the method comprising:
transmitting a message requesting information indicating an expected angle of arrival for a downlink signal at the terminal in positioning; and
receiving the information indicating the expected angle of arrival for the downlink signal.

* * * * *